US010380603B2

(12) United States Patent
Grigsby et al.

(10) Patent No.: US 10,380,603 B2
(45) Date of Patent: Aug. 13, 2019

(54) ASSESSING PERSONALITY AND MOOD CHARACTERISTICS OF A CUSTOMER TO ENHANCE CUSTOMER SATISFACTION AND IMPROVE CHANCES OF A SALE

(75) Inventors: Travis M. Grigsby, Austin, TX (US); Sunil Kumar Mishra, Morrisville, NC (US); Viswanath Srikanth, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 2941 days.

(21) Appl. No.: 12/131,084

(22) Filed: May 31, 2008

(65) Prior Publication Data

US 2009/0299814 A1  Dec. 3, 2009

(51) Int. Cl.
*G06Q 10/00* (2012.01)
*G06Q 30/02* (2012.01)
(52) U.S. Cl.
CPC ......... *G06Q 30/02* (2013.01); *G06Q 30/0201* (2013.01)
(58) Field of Classification Search
CPC ........................... G06Q 30/02; G06Q 30/0201
USPC ........................................ 705/7.29, 7.31, 10
See application file for complete search history.

(56) References Cited

U.S. PATENT DOCUMENTS

| | | | |
|---|---|---|---|
| 5,031,228 A * | 7/1991 | Lu | 382/227 |
| 5,572,596 A | 11/1996 | Wildes et al. | 382/117 |
| 6,008,817 A * | 12/1999 | Gilmore, Jr. | 345/440 |
| 6,099,319 A * | 8/2000 | Zaltman et al. | 434/236 |
| 6,411,687 B1 | 6/2002 | Bohacek et al. | 379/88.21 |
| 6,443,840 B2 * | 9/2002 | Von Kohorn | 463/17 |
| 6,577,329 B1 | 6/2003 | Flickner et al. | 345/774 |
| 2006/0206371 A1 * | 9/2006 | Hill | 705/10 |

OTHER PUBLICATIONS

Hazlett, Richard L; Hazlett, Sasha Yassky; "Emotional Response to Television Commercials: Facial EMG vs Self-Report. (Statistical Data Included)", Mar. 1999, Journal of Advertising Research, v39, n2, p. 7, Dialog 07379551 60072159.*
Lee, Christina Kwai Choi; Marshal Roger, "Measuring influence of the family decision making process using an observational method", 1998, Qualitative Market Research, v1n2, pp. 88-98, Dialog 02329177 86924649.*
Baum, Kym; Nowicki Jr, Stephen; "Perception of Emotion: Measuring decoding accuracy of adult prosodic cues varying intensity", Summer 1998, Journal of Nonverbal Behavior, New York, vol. 22, Iss. 2, p. 89, 19 pages, ProQuest ID 29809088.*

(Continued)

*Primary Examiner* — Jonathan G Sterrett
(74) *Attorney, Agent, or Firm* — Winstead, P.C.

(57) ABSTRACT

A method, system and computer program product for enhancing customer's satisfaction with his/her shopping experience. Facial motion measurements defined in a model for facial expression recognition are utilized. Features from a magnitude of the facial motion measurements defined in the model are identified. A Bayes classifier is utilized to capture dependences among the features used to recommend a better sales approach to the sales professional, or, alternatively, assign a better sales professional to approach the customer thereby enhancing the customer's shopping experience by reducing the possibility of an unpleasant shopping experience.

20 Claims, 4 Drawing Sheets

(56) References Cited

OTHER PUBLICATIONS

"The identification of emotions from gait information", JM Montepare, SB Goldstein . . . —Journal of Nonverbal Behavior, 1987, pp. 33-42.—Springer.*
"Effects of direct and averted gaze on the perception of facially communicated emotion" from sfu.ca RB Adams . . . —Emotion, 2005—ivizlab.sfu.ca.*
Privacy Implications of Biometric Surveillance: The Destruction of Anonymity, [PDF] from betsym.org EA Masiello—2003—betsym. org.*
"Modeling virtual exploratory and shopping dynamics: an environmental psychology approach" [PDF] from ntu.edu.tw MH Huang—Information & management, 2003—Elsevier.*
"Hydra: Multiple people detection and tracking using silhouettes", from dudupi.coml Haritaoglu, D Harwood . . . —vs, 1999—computer. org.*
"Shopping with Companions: Images, Influences and Interpersonal Dilemmas", Robert Prus, Qualitative Sociology, vol. 16, No. 2, 1993.*
Emotion-based biped walking H Lim, A Ishii . . . —Robotica, 2004—Cambridge Univ Press (abstract only).*
Recognizing people by their gait: the shape of motion [PDF] from psu.edu J Little . . . —Videre: Journal of Computer Vision Research, 1998—Citeseer.*
Face recognition using perspective invariant features (Abstract) MS Kamel, HC Shen, AKC Wong, TM Hong . . . —Pattern recognition . . . , 1994—Elsevier.*

The role of emotions in service encounters [PDF] from nccu.edu. twA S Mattila . . . —Journal of Service Research, 2002—jsr.sagepub. com.*
Babin, BJ and Darden, WR, 1996. Good and bad shopping vibes: spending and patronage satisfaction. J Bus Res 35, pp. 201-206 (March).*
"The Influence of Salesperson Selling Behaviors on Customer Satisfaction with Products", Goff, et.al., Journal of Retailing, vol. 73(2), pp. 171-183, Copyright 1997 by New York University.*
"Green branding effects on attitude: functional versus emotional positioning strategies",[PDF] from ehu.es,P Hartmann, VA Ibáñez . . . —Marketing Intelligence & . . . , 2005—emeraldinsight. com.*
Reinterpreting the Myers-Briggs type indicator from the perspective of the five-factor model of personality RR McCrae, PT Costa—Journal of personality, 1989—Wiley Online Library.*
"An alternative" description of personality": the big-five factor structure." LR Goldberg—Journal of personality and social psychology, 1990—psycnet.apa.org.*
A. Gluhak, et al., "Towards Mood Based Mobile Services and Applications," *SpringerLink*, Oct. 5, 2007, vol. 4793/2007, http://www.springerlink.com/content/3763503p110mg847, Abstract, pp. 1-2.
Equis, "Mood Detection and Gaze Recognition," http://dundee.cs. queensu.ca/wiki/index.php/Mood_Detection_and_Gaza_Recognition, pp. 1-2.
Ira Cohen, et al., "Facial Expression Recognition From Video Sequences," University of Illinois at Urbana—Champaign, USA, pp. 1-4.

* cited by examiner

ASSESSING PERSONALITY AND MOOD CHARACTERISTICS OF A CUSTOMER TO ENHANCE CUSTOMER SATISFACTION AND IMPROVE CHANCES OF A SALE

TECHNICAL FIELD

The present invention relates to customer experience with sales associates, and more particularly to enhancing the customer's satisfaction with his/her shopping experience.

BACKGROUND OF THE INVENTION

Sales professionals attempt to assist a customer in purchasing a good or a service. Often, the personality of the sales professional and/or the strategy employed by the sales professional in attempting to consummate a sale affect the chances of a sale and the customer's shopping experience. For example, a customer that is shy and timid may be taken aback from a sales professional that is confrontational and pushy. In this case, the chances of obtaining a sale from such a customer is unlikely. Further, the customer's shopping experience is unpleasant. In another example, a customer that is in a hurry to purchase an item does not want to be interrupted and be subject to a sales pitch for other items. In this case, the chances of obtaining a sale in connection with other items is low. Further, the customer may become annoyed which would affect his/her shopping experience negatively.

If, however, a customer's personality and mood characteristics were assessed, then the sales professional may use a more appropriate sales strategy to consummate the sale as well as to improve the customer's shopping experience. For example, the sales professional may use a less direct sales approach with a customer that is shy and timid.

BRIEF SUMMARY OF THE INVENTION

In one embodiment of the present invention, a method for enhancing customer satisfaction with his/her shopping experience and improving the chances of a sale comprises capturing a facial image of a customer. The method further comprises comparing the captured facial image with a set of facial expressions to associate the captured facial image with an emotional state. Additionally, the method comprises analyzing the captured facial image to assess personality and mood characteristics of the customer. Furthermore, the method comprises generating a report recommending a sales approach to obtain a sale from the customer, where the report is based on the analysis of the captured facial image.

In another embodiment of the present invention, a method for enhancing customer satisfaction with his/her shopping experience and improving the chances of a sale comprises capturing a facial image of a customer. The method further comprises comparing the captured facial image with a set of facial expressions to associate the captured facial image with an emotional state. Additionally, the method comprises analyzing the captured facial image of the customer to assess personality and mood characteristics of the customer. Further, the method comprises analyzing records of sales professionals to identify appropriate sales professionals who are best at obtaining sales from customers with similar personality and mood characteristics as the customer. Furthermore, the method comprises assigning an appropriate sales professional to approach the customer based on the analysis of the captured facial image and the records of sales professionals.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

The present invention comprises a method, system and computer program product for enhancing customer satisfaction with his/her shopping experience and improving the chances of a sale. In one embodiment of the present invention, the personality and mood characteristics of a customer is obtained by analyzing various features of the customer, such as the customer's facial image, the customer's gait, the customer's location of his/her gaze as well as analyzing other personalized information, such as who the customer is shopping with and information contained in the customer's profile (if one exists). By assessing the customer's personality and mood characteristics, a better sales approach may be recommended to the sales professional, or, alternatively, a better sales professional may be assigned to approach the customer thereby enhancing the customer's shopping experience by reducing the possibility of an unpleasant shopping experience as well as increasing the chances of a consummated sale.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

As discussed in the Background section, sales professionals attempt to assist a customer in purchasing a good or service. Often, the personality of the sales professional and/or the strategy employed by the sales professional in attempting to consummate a sale affect the chances of a sale and the customer's shopping experience. If a customer's personality and mood characteristics were assessed, then the sales professional may use a more appropriate sales strategy to consummate the sale as well as to improve the customer's shopping experience. For example, the sales professional may use a less direct sales approach with a customer that is shy and timid. Embodiments of the present invention for assessing a customer's personality and mood characteristics are discussed below in connection with FIGS. 1-2 and 3A-B.

Figure 1:
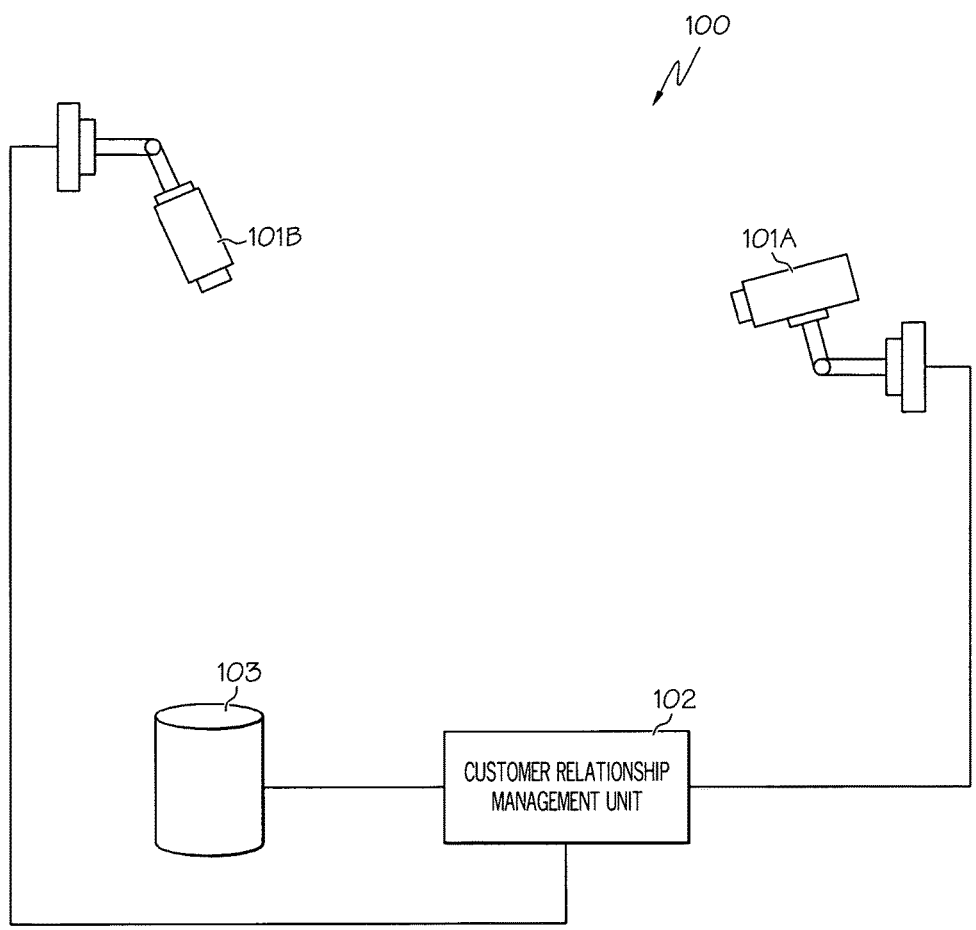
FIG. 1 illustrates a hardware set-up in a store for assessing a customer's personality and mood characteristics in accordance with an embodiment of the present invention.
Figure 2:
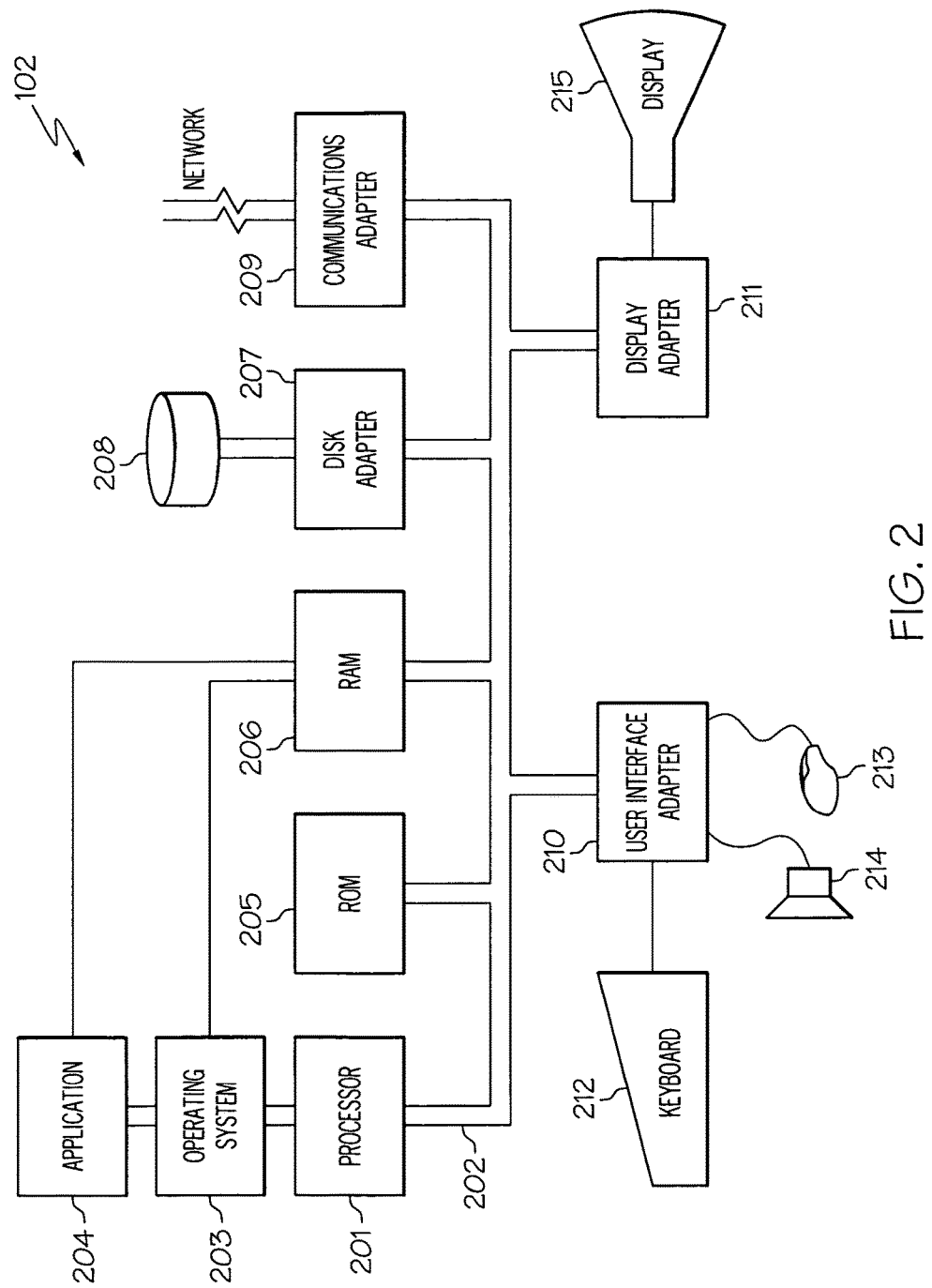
FIG. 2 is a hardware configuration of a customer relationship management unit configured in accordance with an embodiment of the present invention.
Figure 3A:
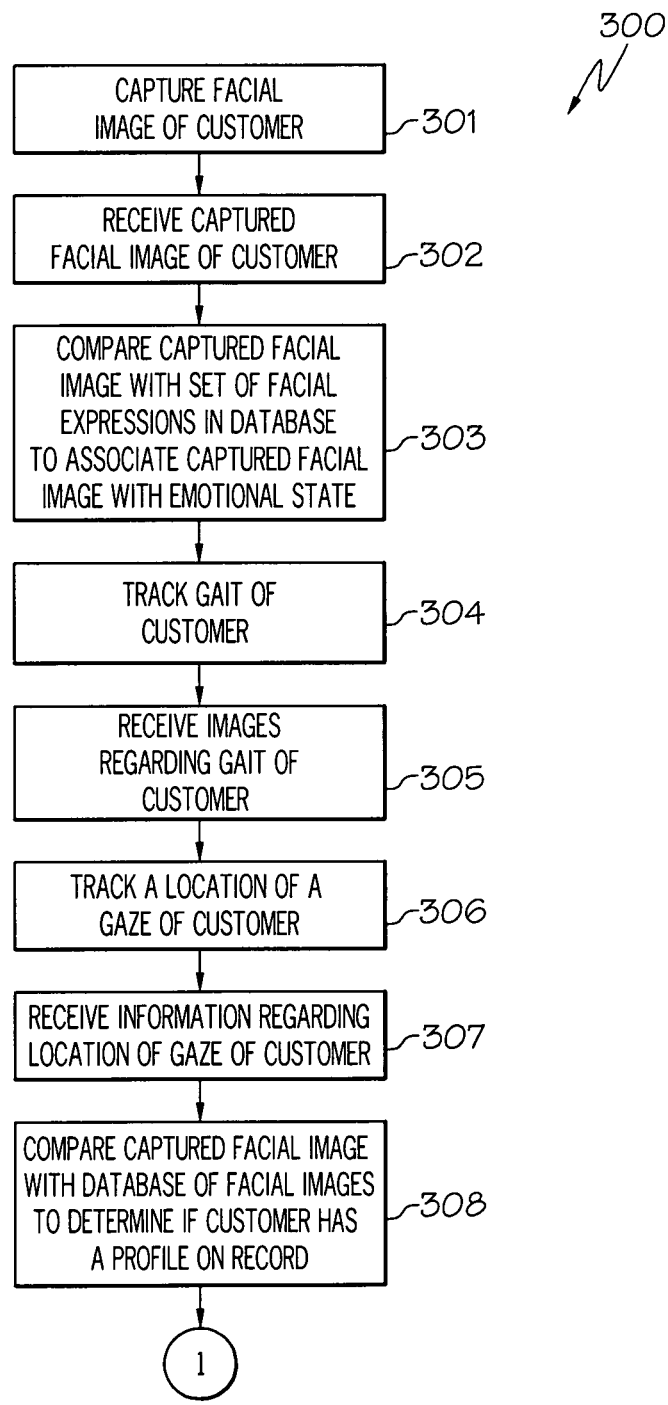
FIGS. 3A-B are a flowchart of a method for enhancing a customer's satisfaction with his/her shopping experience and improving the chances of a sale.
Figure 3B:
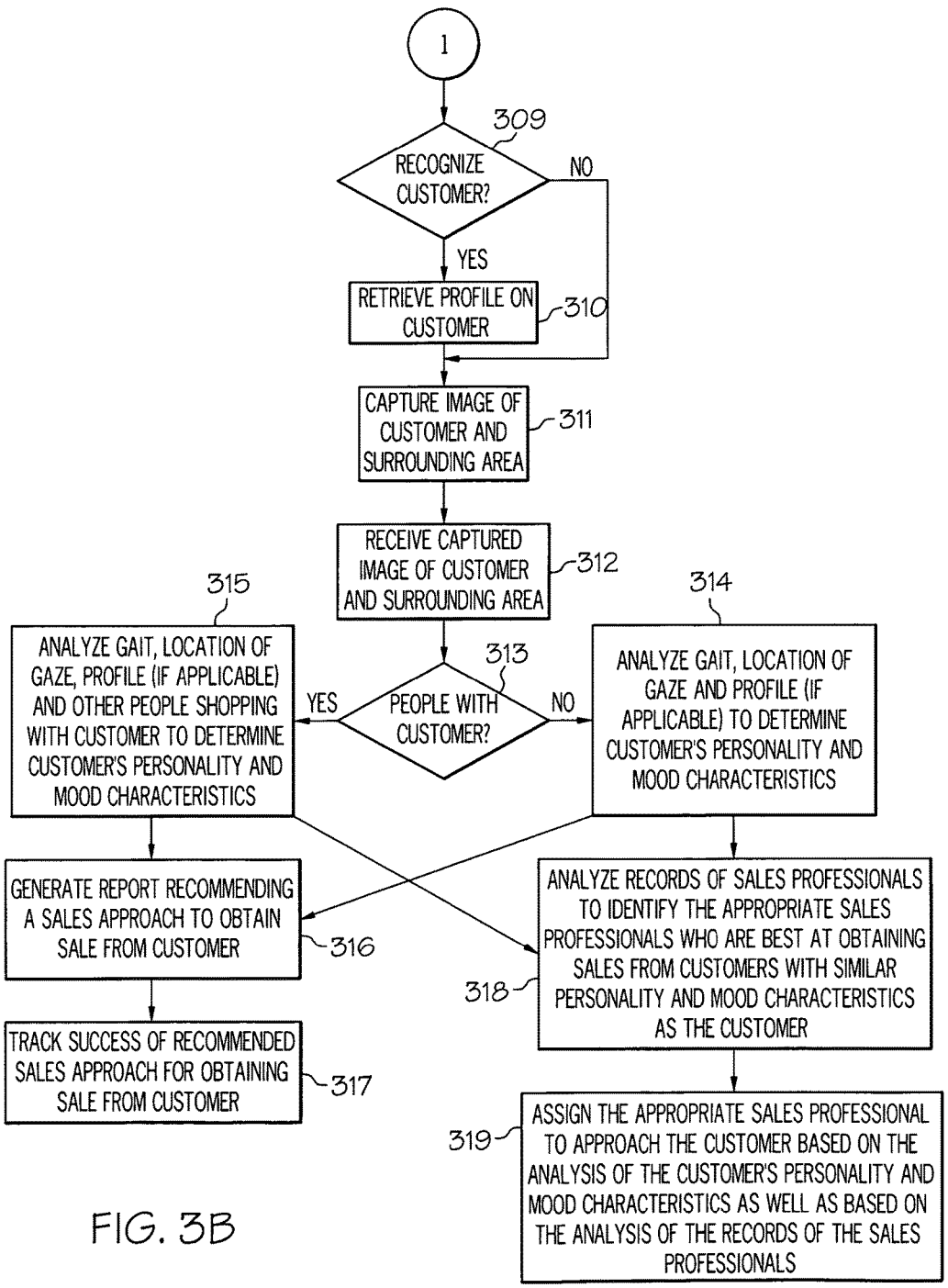

FIG. 1 illustrates a hardware set-up in a store for assessing a customer's personality and mood characteristics. FIG. 2 is a hardware configuration of a customer relationship management unit. FIGS. 3A-B are a flowchart of a method for enhancing a customer's satisfaction with his/her shopping experience and improving the chances of a sale.

FIG. 1—Hardware Set-Up in Store for Assessing Customer's Personality and Mood Characteristics FIG. 1 illustrates a hardware set-up in a store 100 for assessing a customer's personality and mood characteristics in accordance with an embodiment of the present invention.

Referring to FIG. 1, store 100 may include one or more closed circuit television (CCTV) cameras 101A-B which may be mounted to a wall (not shown), a ceiling (not shown) or any other location (e.g., shelf) in store 100. CCTV cameras 101A-B may collectively or individually be referred to as CCTV cameras 101 or CCTV camera, respectively. CCTV cameras 101 may be configured to produce images and/or recordings. Further, CCTV cameras 101 may be either video cameras or digital stills. While FIG. 1 illustrates store 100 using CCTV cameras 101, the principles of the present invention may include other types of cameras that are capable of performing the functions described herein.

Referring to FIG. 1, CCTV cameras 101 may be coupled, via wire or wirelessly, to a customer relationship management unit 102 configured to assess a customer's personality and mood characteristics as discussed herein. Customer relationship management unit 102 may be located either internally or externally to store 100. Further, customer relationship management unit 102 may be coupled to a database 103, located either externally or internally to store 100. Database 103 may be configured to store a set of facial expressions, which may be used for customer relationship management unit 102 to identify an emotional state of the customer. Further, database 103 (or a different database) may store a set of facial images of customers of store 100 with a stored profile. If there is a match between a captured facial image of the customer of store 100 (e.g., CCTV camera 101 captures a facial image of the customer of store 100) and one of the facial images in this set of facial images, then the customer has a profile on record. The profile may include customer information, such as contact information (e.g., name), marketing information (e.g., previous merchandise purchased), success of prior sales' approaches (e.g., indirect sales approach resulted in several sales), etc. The profiles of customers of store 100 may be stored on database 101 or a different database.

Referring to FIG. 1, CCTV cameras 101 may be configured to capture a facial image of the customer of store 100. Capturing facial images is known in the art and will not be described in detail for the sake of brevity. Customer relationship management unit 102 may be configured to recognize an emotional state (e.g., happy, sad, mad) based on the facial expressions displayed in the captured image or through a series of captured images. In one embodiment, one or more captured facial images of the customer is compared to facial expressions stored in database 103. Each facial expression may be associated with an emotional state. Recognizing emotions from one or more captured facial images is discussed in "Facial Expression Recognition from Video Sequences," prepared by Ira Cohen, Nicu Sebe, Ashutosh Garg, Michael S. Lew, and Thomas S. Huang, which is incorporated herein in its entirety by reference. A more detail description of recognizing emotions from one or more captured facial images will not be described herein for the sake of brevity.

Further, CCTV cameras 101 may be configured to track the gait of a customer, such as through a series of captured video sequences. Gait may refer to a customer's manner of walking. For example, a customer may be leisurely walking or perhaps the customer may be pacing, trotting or cantering. A customer's gait may be used to assess the customer's personality and mood characteristics. For example, if the customer is pacing, then that may signify that the customer is nervous and should be approached using a relaxed sales manner and/or by a calm sales professional. In one embodiment, a customer's gait may be determined through a series of video sequences taken by CCTV cameras 101 that are time tracked.

Additionally, CCTV cameras 101 may be configured to track a location of a gaze of the customer of store 101. Gaze tracking apparatuses are known the art and may be accomplished using various technological devices, such as a camera (e.g., CCTV camera 101). Gaze tracking apparatuses may further include using infrared (not shown) or other devices (not shown) to sense, locate and follow the movement of a customer's eyes. For example, in one embodiment, a gaze tracking apparatus, such as camera 101, may monitor eye orientation of the customer as the customer views a display having items displayed thereon. According to the customer's eye orientation, customer relationship management unit 102 may measure the point of the customer's gaze, called a "gaze position," and times the amount/duration of the customer's gaze, thereby providing one indication of interest in the item being observed and one method of measuring interest in the item being displayed. Customer relationship management unit 102 may also calculate a region of video screen surrounding the customer's gaze position. This region, for example, may be a circle that is calculated to include the customer's "actual gaze point" (as opposed to measured gaze position) with a certain probability.

A processor (discussed below in connection with FIG. 2) of customer relationship management unit 102 may include processing algorithms to map the movement of the user's eyes in terms of position to which the user is observing, the speed of the movements of the user's eyes, and some information about the eye itself, such as shape, size, etc. A more detail discussion of gaze-tracking is disclosed in U.S. Pat. No. 6,577,329, which is incorporated herein in its entirety by reference.

While the preceding discusses various embodiments of gaze tracking, the principles of the present invention are not to be limited to such embodiments. The principles of the present invention are not to be limited in scope to any one particular manner in tracking the gaze of a customer, but instead, is to include any manner in tracking the gaze of a customer.

As discussed above, a location of a gaze of a customer can be tracked and the amount/duration of the customer's gaze may provide an indication of interest in the item being observed. Other information may be deduced from the customer's gaze, such as a mood of the customer. For example, if the customer is in an unenthusiastic mood, the customer may not want to be shopping in store 100 except to purchase the one necessary item and hence may not show much interest in anything except purchasing that one item.

Furthermore, one or more images of the customer and the surrounding area may be captured by cameras 101 to determine if the customer is shopping with other people. Based on analyzing which other people the customer is shopping with may provide an insight into the customer's personality and mood characteristics. For example, if the customer is shopping with children, then the customer may be more likely concerned with safety, and may want further information about the safety features of a product a customer has shown interest.

While the above describes cameras 101A-B implementing various functions (e.g., capturing a facial image, tracking the gait of a customer), store 100 may include any number of cameras 101, where each camera 101 may be configured to implement one or more of the functions recited above. For example, one camera 101 may be designated to capture a facial image of the customer. Another camera 101 may be designated to track the gait of the customer.

Further, the above describes obtaining various characteristics or features of the customer which may be used to determine the customer's personality and mood characteristics. The principles of the present invention are not to be limited in determining the customer's personality and mood characteristics based on the above-recited functions.

A description of the hardware configuration of customer relationship management unit 102 for practicing the principles of the present invention is provided below in connection with FIG. 2.

FIG. 2—Hardware Configuration of Customer Relationship Management Unit

FIG. 2 illustrates an embodiment of a hardware configuration of customer relationship management unit 102 (FIG. 1) which is representative of a hardware environment for practicing the present invention. Management unit 102 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, a program for assessing a customer's personality and mood characteristics and generating an appropriate sales approach for the sales professional as discussed below in association with FIGS. 3A-B. Application 204 may further include a program for assessing a customer's personality and mood characteristics and assigning the appropriate sales professional to approach the customer based on the customer's personality and mood characteristics, as discussed further below in association with FIGS. 3A-B.

Referring to FIG. 2, read-only memory ("ROM") 205 may be coupled to system bus 202 and include a basic input/output system ("BIOS") that controls certain basic functions of management unit 102. Random access memory ("RAM") 206 and disk adapter 207 may also be coupled to system bus 202. It should be noted that software components including operating system 203 and application 204 may be loaded into RAM 206, which may be management unit's 102 main memory for execution. Disk adapter 207 may be an integrated drive electronics ("IDE") adapter that communicates with a disk unit 208, e.g., disk drive. It is noted that the program for assessing a customer's personality and mood characteristics and generating an appropriate sales approach for the sales professional, as discussed below in association with FIGS. 3A-B, may reside in disk unit 208 or in application 204. It is further noted that the program for assessing a customer's personality and mood characteristics and assigning the appropriate sales professional to approach the customer based on the customer's personality and mood characteristics, as discussed further below in association with FIGS. 3A-B, may reside in disk unit 208 or in application 204.

Referring to FIG. 2, management unit 102 may further include a communications adapter 209 coupled to bus 202. Communications adapter 209 may interconnect bus 202 with an outside network (not shown) thereby allowing management unit 102 to communicate with cameras 101 (FIG. 1), database 103 (FIG. 1) or other devices.

I/O devices may also be connected to management unit 102 via a user interface adapter 210 and a display adapter 211. Keyboard 212, mouse 213 and speaker 214 may all be interconnected to bus 202 through user interface adapter 210. Data may be inputted to management unit 102 through any of these devices. A display monitor 215 may be connected to system bus 202 by display adapter 211. In this manner, a user is capable of inputting to management unit 102 through keyboard 212 or mouse 213 and receiving output from management unit 102 via display 215 or speaker 214.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

A discussion of an embodiment for enhancing a customer's satisfaction with his/her shopping experience and improving the chances of a sale is provided below in connection with FIGS. 3A-B.

FIGS. 3A-B—Method for Enhancing a Customer's Satisfaction and Improving Chances of Sale FIGS. 3A-B are a flowchart of a method 300 for enhancing a customer's satisfaction with his/her shopping experience and improving the chances of a sale in accordance with an embodiment of the present invention.

Referring to FIG. 3A, in conjunction with FIGS. 1 and 2, in step 301, camera 101 captures a facial image of a customer in store 100. In step 302, management unit 102 receives the captured facial image from camera 101. In step 303, management unit 102 compares the captured facial image with a database (e.g., database 103) of facial expressions to associate the captured facial image with an emotional state.

In step 304, camera 101 tracks the gait of the customer in store 100 As discussed above, gait may refer to a customer's manner of walking. For example, a customer may be leisurely walking or perhaps the customer may be pacing, trotting or cantering. As discussed above, camera 101 may track the gait of a customer, such as through a series of captured video sequences. In step 305, management unit 102 receives these images regarding the gait of the customer from camera 101.

In step 306, camera 101 tracks the location of a gaze of the customer in store 100. As discussed above, camera 101 and other devices may be used to sense, locate and follow the movement of a customer's eyes. In step 307, management unit 102 receives information from these sources regarding the location of the gaze of the customer.

In step 308, management unit 102 compares the captured facial image with a database (e.g., database 103) of facial images of customers with registered store profiles to determine if the customer has a profile on record.

Referring to FIG. 3B, in conjunction with FIGS. 1-2, in step 309, management unit 102 determines if the customer is recognized. As discussed above, management unit 102 compares the captured facial image of the customer with a database of facial images of customers with registered store profiles. If there is a match, then the customer is recognized and has a profile on record. Otherwise, the customer is not recognized and does not have a profile on record.

If the customer is recognized, then, in step 310, management unit 102 retrieves the profile on the customer, such as from a database (e.g., database 103).

If management unit 102 retrieves a profile on the customer (as in step 310) or if the customer is not recognized, then, in step 311, camera 101 captures an image of the customer and the surrounding area. In step 312, management unit 102 receives the captured image of the customer and the surrounding area from camera 101.

In step 313, management unit 102 determines if there are other people with the customer. If there are no other people with the customer, then, in step 314, management unit 102 analyzes the gait of the customer, the location of the gaze of the customer and the profile of the customer (if the customer has a profile on record) to determine the customer's personality and mood characteristics as discussed above.

If, however, there are people with the customer, then, in step 315, management unit 102 analyzes the gait of the customer, the location of the gaze of the customer, the profile of the customer (if the customer has a profile on record) and the other people shopping with the customer to determine the customer's personality and mood characteristics as discussed above.

Upon determining the customer's personality and mood characteristics in step 314 or 315, management unit 102, in step 316, generates a report to a sales professional recommending a sales approach to obtain a sale from the customer.

In step 317, management unit 102 tracks the success of the recommended sales approach provided to the sales professional. By tracking the success of these sales approaches, one may learn which sales approach works best for which type of customer as well as which sales professional may be the best for selling products or services for which type of customer.

Alternatively, after determining the customer's personality and mood characteristics in steps 314 or 315, management unit 102, in step 318 analyzes the records of sales professionals to identify the appropriate sales professionals who are best at obtaining sales from customers with similar personality and mood characteristics as the customer. In step 319, management unit 102 assigns the appropriate sales professional to approach the customer based on the analysis of the customer's personality and mood characteristics as well as based on the analysis of the records of the sales professionals.

By assessing the customer's personality and mood characteristics, a better sales approach may be recommended to the sales professional, or, alternatively, a better sales professional may be assigned to approach the customer thereby enhancing the customer's shopping experience by reducing the possibility of an unpleasant shopping experience as well as increasing the chances of a consummated sale.

While method 300 of FIGS. 3A-B discusses the use of several resources (e.g., captured facial image) to assess the customer's personality and mood characteristics, method 300 is not limited to the use of these resources. Further, method 300 may use one or more of any of the above resources to assess the customer's personality and mood characteristics. That is, method 300 is not limited to using each of the above-recited resources to assess the customer's personality and mood characteristics. Further, the steps of method 300 (e.g., step 301) in connection with obtaining information (e.g., capturing facial image) to be used in assessing the customer's personality and mood characteristics may be reiterated any number of times prior to generating the report to the sales professional for the recommended sales approach or prior to assigning the appropriate sales professional to approach the customer. In this manner, method 300 may ensure to provide a more appropriate recommended sales approach or a more appropriate sales professional to approach the customer.

Method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for enhancing customer satisfaction with his/her shopping experience, the method comprising:
   capturing a facial image of a customer by a camera in a store;
   analyzing, by a customer relationship management unit, said captured facial image to assess personality and mood characteristics of said customer using a three-dimensional wireframe model of a face, wherein said model utilizes a facial action coding system;
   utilizing facial motion measurements defined in said model for facial expression recognition;
   identifying features from a magnitude of said facial motion measurements defined in said model;
   utilizing a Bayes classifier to capture dependencies among said features used to assess said personality and mood characteristics of said customer; and
   generating, by a processor of said customer relationship management unit, a report recommending a sales approach to obtain a sale from said customer, wherein said report is based on said analysis of said captured facial image.

2. The method as recited in claim 1 further comprising:
   tracking a gait of said customer; and
   analyzing said gait of said customer to assess said personality and mood characteristics of said customer;
   wherein said report is based on said analysis of said captured facial image and said gait of said customer.

3. The method as recited in claim 1 further comprising:
tracking a location of a gaze of said customer; and
analyzing said location of said gaze of said customer to assess said personality and mood characteristics of said customer;
wherein said report is based on said analysis of said captured facial image and said location of said gaze of said customer.

4. The method as recited in claim 1 further comprising:
comparing said captured facial image with a set of facial images to determine if said customer has a profile on record;
retrieving said profile on said customer if said customer has said profile on record; and
analyzing said profile of said customer to assess said personality and mood characteristics of said customer;
wherein said report is based on said analysis of said captured facial image and said profile of said customer.

5. The method as recited in claim 1 further comprising:
capturing an image of said customer and a surrounding area indicating that said customer is shopping with other people; and
analyzing said other people shopping with said customer to assess said personality and mood characteristics of said customer;
wherein said report is based on said analysis of said captured facial image and said other people shopping with said customer.

6. The method as recited in claim 1 further comprising:
tracking a success of said recommended sales approach.

7. A system, comprising:
a memory for storing a computer program for enhancing customer satisfaction with his/her shopping experience; and
a processor connected to said memory, wherein said processor is configured to execute the program instructions of the computer program comprising:
  receiving a captured facial image of a customer from a camera in a store;
  analyzing said captured facial image to assess personality and mood characteristics of said customer using a three-dimensional wireframe model of a face, wherein said model utilizes a facial action coding system;
  utilizing facial motion measurements defined in said model for facial expression recognition;
  identifying features from a magnitude of said facial motion measurements defined in said model;
  utilizing a Bayes classifier to capture dependencies among said features used to assess said personality and mood characteristics of said customer; and
  generating a report recommending a sales approach to obtain a sale from said customer, wherein said report is based on said analysis of said captured facial image.

8. The system as recited in claim 7, wherein the program instructions of the computer program further comprise:
receiving images regarding a gait of said customer; and
analyzing said gait of said customer to assess said personality and mood characteristics of said customer;
wherein said report is based on said analysis of said captured facial image and said gait of said customer.

9. The system as recited in claim 7, wherein the program instructions of the computer program further comprise:
receiving information regarding a location of a gaze of said customer; and
analyzing said location of said gaze of said customer to assess said personality and mood characteristics of said customer;
wherein said report is based on said analysis of said captured facial image and said location of said gaze of said customer.

10. The system as recited in claim 7, wherein the program instructions of the computer program further comprise:
comparing said captured facial image with a set of facial images to determine if said customer has a profile on record;
retrieving said profile on said customer if said customer has said profile on record; and
analyzing said profile of said customer to assess said personality and mood characteristics of said customer;
wherein said report is based on said analysis of said captured facial image and said profile of said customer.

11. The system as recited in claim 7, wherein the program instructions of the computer program further comprise:
receiving a captured image of said customer and a surrounding area indicating that said customer is shopping with other people; and
analyzing said other people shopping with said customer to assess said personality and mood characteristics of said customer;
wherein said report is based on said analysis of said captured facial image and said other people shopping with said customer.

12. A computer program product for enhancing customer satisfaction with his/her shopping experience, the computer program product comprising a non-transitory computer readable storage medium having program code embodied therewith, the program code comprising the programming instructions for:
receiving a captured facial image of a customer from a camera in a store;
analyzing, by a customer relationship management unit, said captured facial image to assess personality and mood characteristics of said customer using a three-dimensional wireframe model of a face, wherein said model utilizes a facial action coding system;
utilizing facial motion measurements defined in said model for facial expression recognition;
identifying features from a magnitude of said facial motion measurements defined in said model;
utilizing a Bayes classifier to capture dependencies among said features used to assess said personality and mood characteristics of said customer; and
generating, by said customer relationship management unit, a report recommending a sales approach to obtain a sale from said customer, wherein said report is based on said analysis of said captured facial image.

13. The computer program product as recited in claim 12, wherein the program code further comprises the programming instructions for:
receiving images regarding a gait of said customer; and
analyzing said gait of said customer to assess said personality and mood characteristics of said customer;
wherein said report is based on said analysis of said captured facial image and said gait of said customer.

14. The computer program product as recited in claim 12, wherein the program code further comprises the programming instructions for:
receiving information regarding a location of a gaze of said customer; and analyzing said location of said gaze of said customer to assess said personality and mood characteristics of said customer;
wherein said report is based on said analysis of said captured facial image and said location of said gaze of said customer.

15. The computer program product as recited in claim 12, wherein the program code further comprises the programming instructions for:
comparing said captured facial image with a set of facial images to determine if said customer has a profile on record;
retrieving said profile on said customer if said customer has said profile on record; and
analyzing said profile of said customer to assess said personality and mood characteristics of said customer;
wherein said report is based on said analysis of said captured facial image and said profile of said customer.

16. The computer program product as recited in claim 12, wherein the program code further comprises the programming instructions for:
receiving a captured image of said customer and a surrounding area indicating that said customer is shopping with other people; and
analyzing said other people shopping with said customer to assess said personality and mood characteristics of said customer;
wherein said report is based on said analysis of said captured facial image and said other people shopping with said customer.

17. A method for enhancing customer satisfaction with his/her shopping experience, the method comprising:
capturing a facial image of a customer by a camera in a store;
analyzing, by a customer relationship management unit, said captured facial image of said customer to assess personality and mood characteristics of said customer using a three-dimensional wireframe model of a face, wherein said model utilizes a facial action coding system;
utilizing facial motion measurements defined in said model for facial expression recognition;
identifying features from a magnitude of said facial motion measurements defined in said model;
utilizing a Bayes classifier to capture dependencies among said features used to assess said personality and mood characteristics of said customer;
analyzing, by said customer relationship management unit, records of sales professionals to identify appropriate sales professionals who are best at obtaining sales from customers with similar personality and mood characteristics as said customer; and
assigning, by a processor of said customer relationship management unit, an appropriate sales professional to approach said customer based on said analysis of said captured facial image and said records of sales professionals.

18. The method as recited in claim 17 further comprising:
tracking a gait of said customer;
analyzing said gait of said customer to assess said personality and mood characteristics of said customer; and
assigning an appropriate sales professional to approach said customer based on said analysis of said captured facial image, said gait of said customer and said records of sales professionals.

19. The method as recited in claim 17 further comprising:
tracking a location of a gaze of said customer;
analyzing said location of said gaze of said customer to assess said personality and mood characteristics of said customer; and
assigning an appropriate sales professional to approach said customer based on said analysis of said captured facial image, said location of said gaze of said customer and said records of sales professionals.

20. The method as recited in claim 17 further comprising:
comparing said captured facial image with a set of facial images to determine if said customer has a profile on record;
retrieving said profile on said customer if said customer has said profile on record;
analyzing said profile of said customer to assess said personality and mood characteristics of said customer; and
assigning an appropriate sales professional to approach said customer based on said analysis of said captured facial image, said profile of said customer and said records of sales professionals.

* * * * *